(12) United States Patent
Hooker et al.

(10) Patent No.: US 6,609,191 B1
(45) Date of Patent: Aug. 19, 2003

(54) METHOD AND APPARATUS FOR SPECULATIVE MICROINSTRUCTION PAIRING

(75) Inventors: Rodney E. Hooker, Austin, TX (US);
Dinesh K. Jain, Austin, TX (US);
Terry Parks, Austin, TX (US)

(73) Assignee: IP-First, LLC, Freemont, CA (US)

( * ) Notice: Subject to any disclaimer, the term of this patent is extended or adjusted under 35 U.S.C. 154(b) by 0 days.

(21) Appl. No.: 09/520,855

(22) Filed: Mar. 7, 2000

(51) Int. Cl.[7] .............................. G06F 9/30; G06F 9/38; G06F 9/40

(52) U.S. Cl. .................... 712/216; 712/219; 712/213; 712/242; 712/243; 712/245

(58) Field of Search ........................ 712/23, 216, 208, 712/247, 219, 215, 213, 226, 242, 243, 237, 245

(56) References Cited

U.S. PATENT DOCUMENTS 4,325,121 A * 4/1982 Gunter et al. ............... 712/247
5,752,064 A * 5/1998 Horst ........................ 712/216

* cited by examiner

Primary Examiner—Daniel H. Pan
(74) Attorney, Agent, or Firm—E. Alan Davis; James W. Huffman (57) ABSTRACT

An apparatus and method are provided for speculatively pairing micro instructions for parallel execution within a single pipeline of a microprocessor and subsequently splitting the paired micro instructions in the same clock cycle as the pairing if a resource conflict or operand dependency is detected. The apparatus includes multiplexing logic that feeds back a second of a pair of micro instructions stored in an instruction register back into the instruction register for sequential execution after the first micro instruction if a translator detects late in the clock cycle that a resource conflict or operand dependency exists. An instruction pair indicator is provided along with the pair of micro instructions down to the execution stages to inform the execution stages whether the second micro instruction is valid for parallel execution with the first micro instruction. The method may also be used in conjunction with a micro instruction queue. In one embodiment, an additional MMX adder is provided such that PADD instructions may be translated and paired for parallel execution within the single pipeline of the microprocessor.

49 Claims, 7 Drawing Sheets

FIG. 4 (Con't.)

FIG. 4 (Con't.)

FIG. 5

| Cycle | Instruction Buffer | Instruction 1 | Instruction 2 | Pair Indicator |
|---|---|---|---|---|
| 1 | PMUL M1,M2; PMUL M3,M4 | *** | *** | *** |
| 2 | *** | PMUL M1,M2 | PMUL M3,M4 | 0 |
| 3 | *** | PMUL M3,M4 | *** | 0 |
| 4 | *** | *** | *** | *** |
| 5 | *** | *** | *** | *** |
| 6 | PADD M1,M2; PMUL M1,M4 | *** | *** | *** |
| 7 | *** | PADD M1,M2 | PMUL M1,M4 | 0 |
| 8 | *** | PMUL M1,M4 | *** | 0 |
| 9 | *** | *** | *** | *** |
| 10 | *** | *** | *** | *** |
| 11 | PADD M1,M2; PMUL M3,M4 | *** | *** | *** |
| 12 | *** | PADD M1,M2 | PMUL M3,M4 | 1 |
| 13 | *** | *** | *** | *** |
| 14 | *** | *** | *** | *** |
| 15 | PADD M1,M2; PADD M3,M4 | *** | *** | *** |
| 16 | *** | PADD M1,M2 | PADD M3,M4 | 1 |
| 17 | *** | *** | *** | *** |

METHOD AND APPARATUS FOR SPECULATIVE MICROINSTRUCTION PAIRING

BACKGROUND OF THE INVENTION

1. Field of the Invention

This invention relates in general to the field of microprocessor instruction translation, and more particularly to translating and pairing of micro instructions for parallel execution.

2. Description of the Related Art

A present day pipeline microprocessor has a single path, or channel, or pipeline, that is divided into stages that perform specific tasks. Each of the specific tasks are part of an overall operation that is directed by a programmed instruction, or macro instruction. Each of the macro instructions in a software application program, such as a spreadsheet program, is executed in sequence by the microprocessor. As a macro instruction enters the first stage of the pipeline, certain tasks are accomplished. The instruction is then passed to subsequent stages for accomplishment of subsequent tasks. Following completion of a final task, the instruction completes execution and exits the pipeline. Execution of macro instructions by a pipeline microprocessor is very much analogous to the manufacture of items on an assembly line.

One of the first stages in the pipeline is the translation stage. In the translation stage, macro instructions, such as Intel x86 architecture instructions, are translated into one or more micro instructions. Examples of x86 macro instruction are the MOV (move data), MUL (multiply), PADD (MMX packed add) and PMUL (MMX packed multiply) instructions. The micro instructions generated when macro is are translated are typically simpler instructions than the macro instructions. The micro instructions are passed down the pipeline and executed by the various stages of the pipeline. When completion of the last micro instruction making up the macro instruction occurs, execution of the macro instruction is complete.

There is an incessant demand for improvement in the performance of microprocessors. That is, there is a constant demand for an increase in the number of instructions per second executed by microprocessors. One means of improving performance is for a microprocessor to execute instructions in parallel, where possible, rather than sequentially. That is, parallel execution occurs where a microprocessor executes two or more instructions concurrently, rather than in sequence. However, parallel instruction execution within microprocessors may present certain challenges.

In particular, instructions that have a resource conflict may not be executed in parallel, but must be executed sequentially. For example, if two instructions require the same resource for execution, such as an adder, the instructions may not be executed in parallel if there is only one adder, but must instead be executed sequentially. However, if two adders are present within the microprocessor, the possibility exists that the two instructions may be executed in parallel rather than sequentially.

Furthermore, even if multiple execution resources are present, the instructions may not be executed in parallel if the instructions have an operand dependency. For example, if instruction A requires as an operand a result from instruction B, then the two instructions may not be executed in parallel. The instructions may not be executed in parallel because the instruction B must be executed first and produce its result in order for the instruction A to use the result of the second instruction as an operand.

As may be readily observed, if micro instructions are executed in parallel within the microprocessor pipeline, on the whole, the number of macro instructions that will be executed per second will tend to increase.

One means of executing micro instructions in parallel in a single pipeline of a microprocessor is to pair two micro instructions and send them down the pipeline together for parallel execution by execution stages of the single pipeline. U.S. patent application Ser. No. 09/313,907 filed May 14, 1999 entitled PAIRING OF MICRO INSTRUCTIONS IN THE INSTRUCTION QUEUE, now U.S. Pat. No. 6,330, 657, having the same assignee, and hereby incorporated by reference, describes a micro instruction pairing method. The application describes a method in which a translator receives macro instructions and generates micro instructions that are stored into an instruction queue. Subsequent to the generation of the micro instructions and their storage in the instruction queue, pairing logic scans the micro instructions in the instruction queue to determine whether two of the micro instructions may be paired for parallel execution. If the pairing logic finds two pairable micro instructions in the instruction queue and they do not have a resource conflict or operand dependency, the pairing logic pairs the micro instructions and stores them in an instruction register. The instruction register sends the paired micro instructions down to subsequent stages in the pipeline for parallel execution.

This technique is particularly useful when the downstream stages of the pipeline are not waiting to receive micro instructions to execute. That is, the translator has an entire clock cycle to translate macro instructions into micro instructions. Likewise, the pairing logic has an entire clock cycle to scan the instruction queue and pair micro instructions.

However, when the downstream stages of the pipeline are waiting to receive micro instructions to execute, i.e., the instruction register is empty, it is disadvantageous to store the micro instructions in the instruction queue in hopes of later pairing micro instructions. In this situation, the translator provides the next micro instruction directly to the instruction register so that the downstream stages of the pipeline have an instruction to execute. However, it should be recognized that a potential missed opportunity to pair micro instructions is lost since pairing is performed only on micro instructions already stored in the instruction queue.

Thus, what is needed is a translator that is capable of translating macro instructions into micro instructions and pairing the micro instructions for provision to an instruction register when necessary in a single clock cycle. However, translation of x86 instructions into micro instructions may take a substantial portion of the clock cycle, leaving little time for a determination of whether the prospectively pairable micro instructions have a resource conflict or operand dependency. This is largely due to the nature of x86 macro instructions.

In particular, x86 macro instructions are variable in length. For example, some x86 macro instructions are a single byte long, whereas other x86 macro instructions are multiple bytes long. Thus, as the translator translates macro instructions into micro instructions it must examine a fetched stream of bytes to determine the length of each instruction and frame the stream of bytes into distinct x86 macro instructions. Once the macro instructions are framed, their instruction type (such as integer, MMX or floating point) must be determined, various operands must be parsed, etc., and finally the constituent micro instructions must be generated. All of these operations combine to consume a significant portion of the microprocessor clock cycle used to perform translation leaving little time to perform the pairing of micro instructions, in particular the necessary checks for resource conflicts and operand dependencies.

Therefore, what is needed is an apparatus that allows a translator time to determine if two micro instructions are pairable, in addition to the normal time required to generate the micro instructions, without incurring an additional clock cycle to pair the micro instructions.

SUMMARY

To address the above-detailed deficiencies, it is an object of the present invention to provide a microprocessor that speculatively pairs micro instructions and selectively splits the paired micro instructions if a resource conflict or operand dependency is detected. Accordingly, in attainment of the aforementioned object, it is a feature of the present invention to provide a microprocessor for speculatively pairing micro instructions for parallel execution within a single pipeline, the micro instructions being paired within the single pipeline when they utilize non-conflicting resources. The microprocessor includes a translator that receives macro instructions and generates a pair of micro instructions. The microprocessor also includes instruction pair split logic, coupled to the translator, that splits the pair of micro instructions when they utilize a conflicting resource.

An advantage of the present invention is that it pairs micro instructions for parallel execution within a single pipeline of a microprocessor without incurring additional clock cycles to pair the micro instructions beyond the number of clock cycles required to translate single or non-paired micro instructions. Another advantage of the present invention is that it is capable of generating paired micro instructions and retiring associated macro instructions from an instruction buffer in a single clock cycle even though only a relatively small amount of time is available for determining whether the paired micro instructions have a resource conflict or operand dependency.

In another aspect, it is a feature of the present invention to provide an apparatus for selectively unpairing speculatively paired first and second micro instructions for parallel execution within a single pipeline of a microprocessor, the speculative pairing performed by a translator of the microprocessor, the unpairing performed when the micro instructions utilize a conflicting resource, the microprocessor also having an instruction register for storing the first and second micro instructions. The apparatus includes an unpairing signal generated by the translator that indicates whether the first and second micro instructions utilize the conflicting resource within the single pipeline, instruction redirection logic, coupled to the instruction register, that redirects the second micro instruction to the instruction register, and control logic, coupled to the instruction redirection logic, that controls the instruction redirection logic to selectively redirect the second micro instruction to the instruction register in response to the unpairing signal.

In yet another aspect, it is a feature of the present invention to provide an apparatus for selectively unpairing speculatively paired micro instructions for parallel execution within a single pipeline of a microprocessor by a translator of the microprocessor, the unpairing performed when the paired micro instructions utilize a conflicting resource, the microprocessor having an instruction register for storing the paired micro instructions. The apparatus includes a pair indicator that indicates whether the paired micro instructions are paired for parallel execution within the single pipeline, and pair disable logic, coupled to the translator and the pair indicator, that clears the pair indicator when the paired micro instructions utilize the conflicting resource.

In yet another aspect, it is a feature of the present invention to provide a microprocessor for speculatively pairing micro instructions for parallel execution within a single pipeline. The microprocessor includes a translator that translates macro instructions into paired micro instructions for parallel execution within the single pipeline, an instruction register, coupled to the translator that stores the paired micro instructions, and two or more resources within the single pipeline of the microprocessor, operatively coupled to the instruction register, that execute micro instructions. The microprocessor also includes instruction reorder logic, coupled between the translator and the instruction register, that reorders the paired micro instructions for sequential execution within the single pipeline rather than parallel execution when the paired micro instructions utilize the same one of the two or more resources.

In yet another aspect, it is a feature of the present invention to provide a method for speculatively pairing micro instructions for parallel execution within a single pipeline of a microprocessor. The method includes pairing first and second micro instructions for parallel execution within the single pipeline, determining if the first and second micro instructions utilize a conflicting resource, and splitting the first and second micro instructions for sequential execution after the pairing if the first and second micro instructions utilize the conflicting resource.

BRIEF DESCRIPTION OF THE DRAWINGS

These and other objects, features, and advantages of the present invention will become better understood with regard to the following description, and accompanying drawings where.

DETAILED DESCRIPTION

Figure 1:
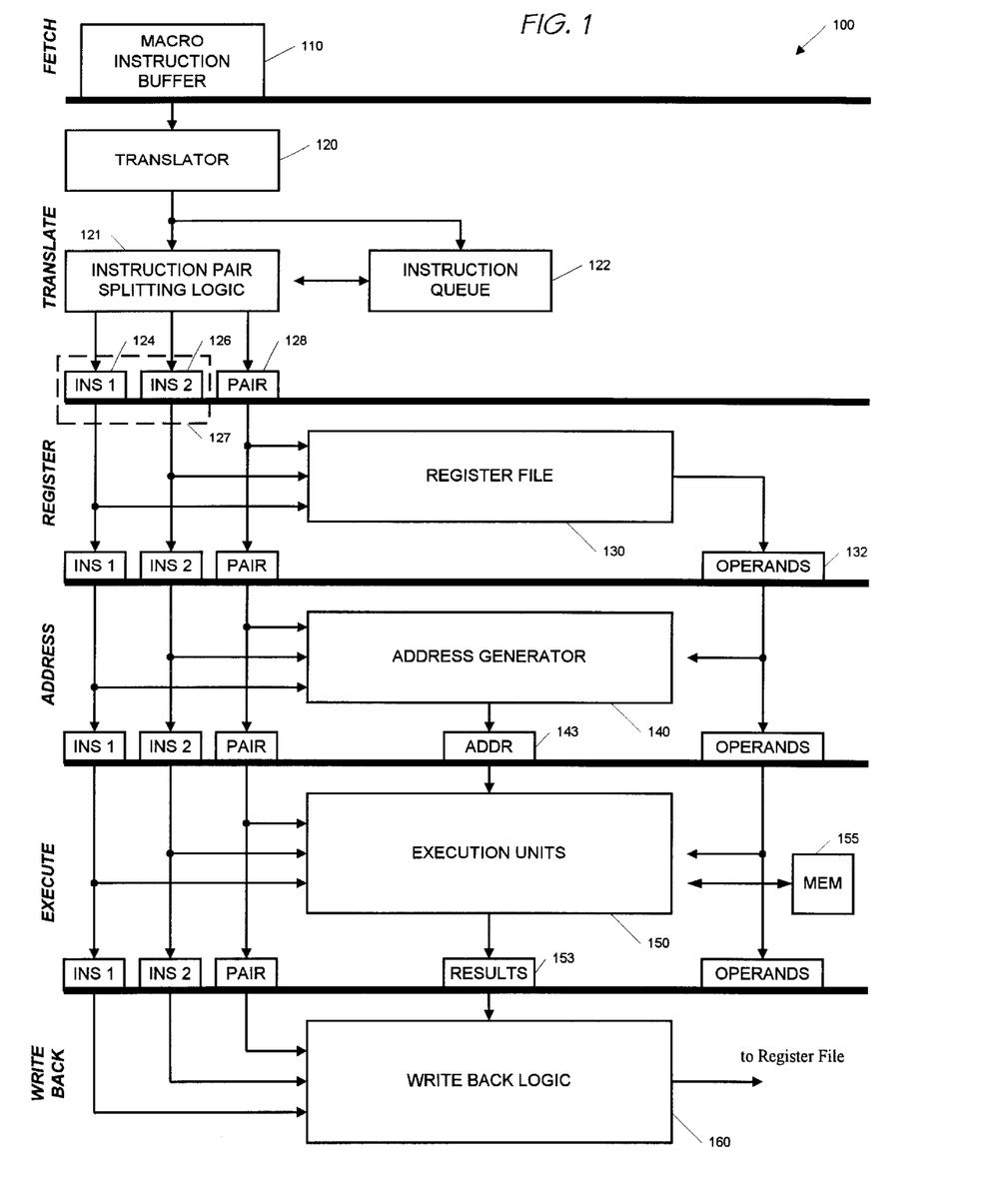
FIG. 1 is a block diagram of a pipelined microprocessor including an apparatus for splitting speculatively paired micro instructions according to the present invention.

Referring to FIG. 1, a block diagram of a pipeline microprocessor 100 according to the present invention is shown. The microprocessor 100 includes fetch, translate, register, address, execute and write-back stages in a single pipeline, as shown. Although the invention is described with respect to a microprocessor 100 having only one pipeline, the invention also contemplates pairing of micro instructions for parallel execution within a single pipeline of a microprocessor having multiple pipelines.

The microprocessor 100 includes a macro instruction buffer 110 for storing macro instructions, such as x86 instructions. The macro instructions are fetched into the macro instruction buffer 110 from a memory 155. The memory 155 comprises a system memory and optionally a cache memory.

The microprocessor 100 also includes a translator 120 coupled to the macro instruction buffer 110. The translator 120 receives macro instructions from the macro instruction buffer 110 and translates the macro instructions to generate micro instructions. The translator 120 generates pairs of micro instructions that may be executed in parallel within the single pipeline of the microprocessor 100. The translator 120 speculatively pairs micro instructions and subsequently determines whether the paired micro instructions must be split, or unpaired, for sequential execution, rather than for parallel execution, as will be described in detail below.

The microprocessor 100 also includes instruction registers 124 and 126 for storing the micro instructions generated by the translator 120, and in particular the pairs of micro instructions generated by the translator 120. In one embodiment, the instruction registers 124 and 126 comprise a single instruction register, referred to as instruction register 127 for clarity.

The microprocessor 100 also includes a pair indicator 128, or paired instruction indicator 128, or instruction pair indicator 128, for indicating whether the micro instructions stored in the instruction register 127 may be executed in parallel within a single pipeline of the microprocessor 100. Preferably, the pair indicator 128 comprises a register for storing a status indicator bit. If the pair indicator 128 is set, the micro instructions stored in the instruction register 127 may be executed in parallel, whereas if the pair indicator 128 is clear, the micro instructions must be executed sequentially.

The microprocessor 100 also includes instruction pair split logic 121, coupled to the translator 120, instruction register 127 and pair indicator 128. The instruction pair split logic 121 operates to split the paired micro instructions so that they are executed sequentially within the single pipeline of the microprocessor 100 rather than in parallel. That is, the split logic 121 operates to disable the pairing of the paired micro instructions generated by the translator 120.

The microprocessor 100 also includes an instruction queue 122, coupled to the translator 120 and instruction pair split logic 121, for storing micro instructions generated by the translator 120 until the instruction register 127 becomes available. Preferably, the instruction queue 122 comprises a plurality of registers for storing the micro instructions. In one embodiment, the instruction queue 122 comprises a three-deep queue, each level capable of storing four micro instructions each. Preferably, the instruction queue 122 also includes pair indicators, similar to pair indicator 128, for indicating whether micro instructions stored within the instruction queue 122 are paired for parallel execution within the microprocessor 100 pipeline.

The microprocessor 100 also includes a register file 130, configured to receive the paired micro instructions from the instruction register 127 and to receive the pair indicator 128. The register file 130 comprises a set of registers, such as an x86 register file, for storing and providing operands 132 of macro instructions. The micro instructions 124 and 126 specify which of the registers in the register file 130 will be used as operands 132. The operands 132 may be used directly in a computation by later stages of the microprocessor 100 to compute an address 143 or a result 153, or they may be results of computations that are pending a write to memory 155. The register file 130 is a resource utilized by the paired micro instructions. In one embodiment, the register file 130 is configured to provide parallel access to registers within the register file 130 by the paired micro instructions depending upon whether the pair indicator 128 indicates the micro instructions are paired for parallel execution within a single pipeline of the microprocessor 100.

The microprocessor 100 further comprises an address generator 140, configured to receive the paired micro instructions from the instruction register 127, to receive the pair indicator 128 and operands 132 from the register file 130, and to generate an address 143 for accessing memory 155. The address generator 140 is a resource utilized by the paired micro instructions. Preferably, the address generator 140 is configured to generate addresses in parallel as needed by the paired micro instructions depending upon whether the pair indicator 128 indicates the micro instructions are paired for parallel execution within a single pipeline of the microprocessor 100.

The microprocessor 100 further comprises one or more execution units 150, configured to receive the paired micro instructions from the instruction register 127, the pair indicator 128 and operands 132 from the register file 130. The execution units 150 perform memory 155 accesses or other operations, such as arithmetic operations, to generate results 153. The execution units 150 comprise resources utilized by the paired micro instructions. The execution units 150 comprise resources configured to perform operations specified by the paired micro instructions in parallel depending upon whether the pair indicator 128 so indicates. The execution units 150 will be described in more detail below.

The microprocessor 100 further comprises write-back logic 160, configured to receive the paired micro instructions from the instruction register 127, the pair indicator 128 and results 153 from the execution units 150. The write-back logic 160 provides the results 153 back to the register file 130 for storage in a destination register of the register file 130. The write-back logic 160 is a resource utilized by the paired micro instructions. In one embodiment, the write-back logic 160 is configured to write back results to the register file 130 in parallel as needed by the paired micro instructions depending upon whether the pair indicator 128 indicates the micro instructions are paired for parallel execution within a single pipeline of the microprocessor 100.

Figure 2:
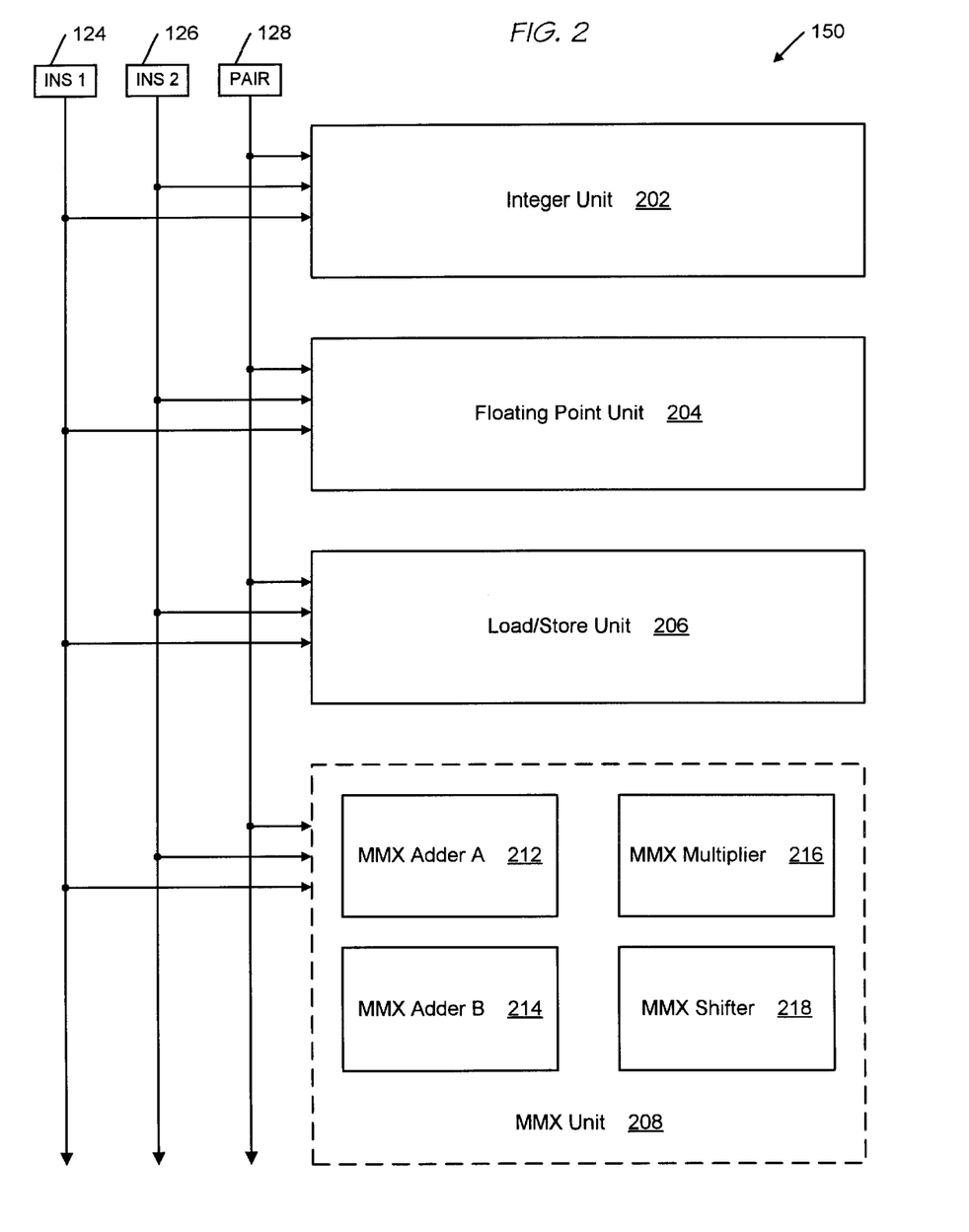
FIG. 2 is a detailed block diagram of the execution stage of the microprocessor of FIG. 1 according to the present invention.

Referring now to FIG. 2, a block diagram illustrating in more detail the execution units 150 of FIG. 1 is shown. The execution units 150 include an integer unit 202, a floating point unit 204, load/store unit 206 and an MMX unit 208, each configured to receive the contents of instruction register 124, instruction register 126 and pair indicator 128.

The integer unit 202 includes an integer arithmetic logic unit (ALU) for performing integer arithmetic or logical operations on operands 132 and generating integer results 153. In one embodiment, the integer unit 202 includes only a single integer ALU resource and is therefore incapable of executing paired micro instructions in parallel within the integer unit 202. That is, if each of the paired micro instructions specifies utilization of the single ALU resource, then the translator 120 detects this condition and communicates to the instruction pair split logic 121 to split the speculatively paired micro instructions generated by the translator 120. However, in another embodiment, the integer unit 202 includes multiple integer ALU resources and is capable of executing the paired micro instructions in parallel.

The floating point unit 204 includes a floating point arithmetic logic unit (ALU) for performing floating point arithmetic or logical operations on operands 132 and generating floating point results 153. In one embodiment, the floating point unit 204 includes only a single floating point ALU resource and is therefore incapable of executing paired micro instructions in parallel within the floating point unit 204; whereas, in another embodiment the floating point unit 204 includes multiple floating point ALU resources and is capable of executing the paired micro instructions in parallel.

The load/store unit 206, or memory access unit 206, includes data path resources for retrieving operands 132 from memory 155 and storing results 153 to memory 155. In one embodiment, the load/store unit 206 is comprised within the integer unit 202. In one embodiment, the load/store unit 206 includes only a single resource for loading and storing from and to memory 155 and is therefore incapable of executing paired micro instructions in parallel within the load/store unit 206; whereas, in another embodiment the load/store unit 206 includes multiple resources for loading and storing and is capable of executing the paired micro instructions in parallel.

Within x86 microprocessors, an MMX instruction set has been developed for multimedia audio and visual applications. The MMX instruction set complements the already existing integer and floating point instruction set of Pentium architecture microprocessors. The MMX instruction set includes mainly arithmetic instructions for performing the demanding arithmetic-intensive operations of multimedia software programs. Due to the time-critical nature of audio and visual applications, increased performance of MMX instructions is desired.

One means of improving MMX instruction performance is to execute distinct MMX instructions in parallel rather than sequentially. However, execution of MMX instruction requires utilization of MMX resources, such as adders, multipliers, shifters, etc. Parallel execution of two or more MMX instructions is only possible where there is no conflict or contention between the two or more MMX instructions for use of the resources to perform the MMX instructions.

MMX instruction execution resource conflicts may be minimized by replicating MMX execution resources within the microprocessor. However, replicating MMX instruction execution resources can be costly in terms of both space and power. Therefore, it may be desirable to replicate only certain MMX resources and not replicate others. Thus, a microprocessor that would execute MMX instructions in parallel must be capable of recognizing resource conflicts among MMX instructions. The present inventors have recognized one embodiment of the present invention in which a cost-effective solution to the need for improved MMX performance is to supply a second MMX adder circuit for performing parallel executions of MMX add instructions.

In the embodiment shown in FIG. 2, the MMX unit 208 includes a first MMX adder A 212, a second MMX adder B 214, an MMX multiplier 216 and an MMX shifter 218. Adder A 212 and adder B 214 are configured to add MMX instruction operands and generate a sum of the operands. Adder A 212 and adder B 214 are capable of operating in parallel to execute paired micro instructions concurrently within the single pipeline of the microprocessor 100.

The MMX multiplier 216 comprises logic capable of multiplying two MMX instruction operands and generating a product of the operands as specified in the micro instructions. The MMX shifter 218 comprises logic capable of performing logical binary operations, such as left and right shifts of a specified number of bits, on MMX instruction operands as specified in the micro instructions.

In other embodiments, although units 202, 204, 206 and 208 of FIG. 2 may not have within them multiple resources for performing two operations of the same type in parallel (e.g., the integer unit 202 does not have multiple integer ALU resources and therefore is not capable of executing paired integer type micro instructions in parallel with itself), two micro instructions may nevertheless be paired for parallel execution within the single pipeline of the microprocessor 100 because the paired micro instructions are of different types. For example, an integer type micro instruction might be paired with an MMX type micro instruction for parallel execution on two distinct resources within the single pipeline of the microprocessor 100.

Figure 3:
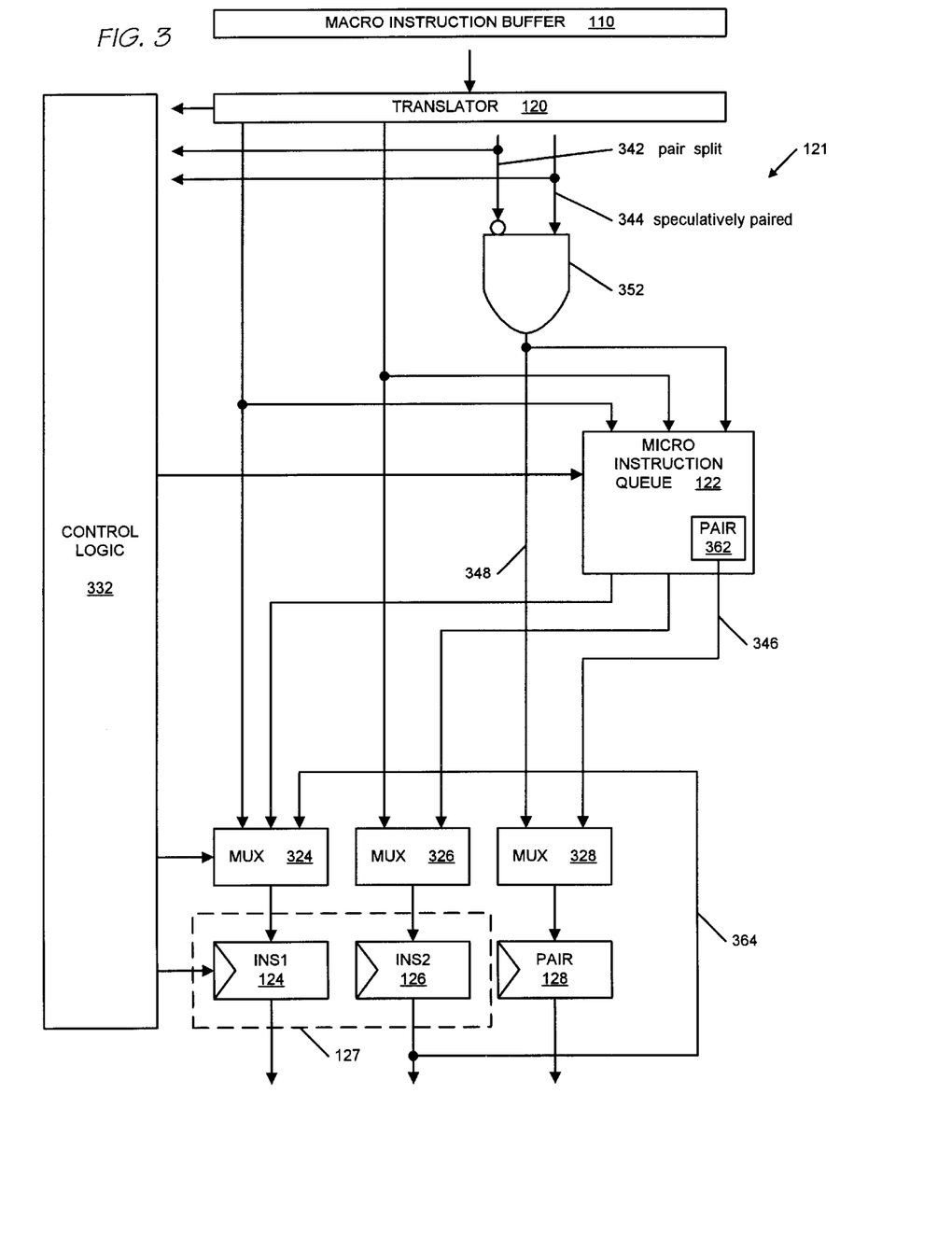
FIG. 3 is a detailed block diagram of the instruction pair splitting logic of the microprocessor of FIG. 1 according to the present invention.

Referring now to FIG. 3, a block diagram illustrating in more detail the instruction pair split logic 121 of FIG. 1 is shown. The instruction pair split logic 121 includes an AND gate 352, or pair disable logic 352, configured to receive a pair split signal 342, or unpairing signal 342, or pair disable signal 342, and a speculatively paired signal 344 from the translator 120 and to generate a pair indicator signal 348 for programming pair indicator 128 and a pair indicator 362 in instruction queue 122.

The instruction pair split logic 121 also includes a set of multiplexers 324, 326 and 328, coupled to the translator 120, the instruction register 127 and instruction queue 122.

The instruction pair split logic 121 also includes control logic 332, coupled to the translator 120, the instruction register 127, instruction queue 122 and multiplexers 324, 326 and 328. The control logic 332 receives the pair split signal 342 and speculatively paired signal 344 and controls storage of micro instructions in the instruction queue 122 and instruction register 127 in response to the pair split signal 342 and speculatively paired signal 344.

In general, control logic 332 controls multiplexers 324, 326 and 328 to select between the translator 120 and the instruction queue 122 as a source of micro instructions and pair indicators for storage in instruction register 127 and pair indicator 128. Multiplexers 324 and 326 are also referred to collectively as instruction redirection logic, or instruction selection logic, or instruction reorder logic. In addition, control logic 332 controls multiplexer 324 to redirect a micro instruction from instruction register 126 back to instruction register 124 thereby effecting a split of paired micro instructions, as described below.

The translator 120 generates the speculatively paired signal 344 to indicate whether two micro instructions generated by the translator 120 have a likelihood of being pairable for parallel execution within the single pipeline of the microprocessor 100. In one embodiment, the translator 120 asserts the speculatively paired signal 344 if two micro instructions have the same instruction type.

For example, if the translator 120 translates two MMX instructions and generates two MMX micro instructions, then the translator 120 would assert the speculatively paired signal 344 to indicate that the two micro instructions were pairable for parallel execution. Advantageously, the translator 120 may determine the type of the micro instructions generated by the translation of the macro instructions sooner than it can determine whether the two micro instructions have a resource conflict or operand dependency. By determining a likelihood of generating a pair of micro instructions, the translator 120 advantageously stores the pair of micro instructions in the instruction register 127 and subsequently, as will be discussed below, splits the pair of micro instructions if the translator 120 later discovers a resource conflict or operand dependency.

Although an embodiment is described in which the translator 120 asserts the speculatively paired signal 344 if the pair of micro instructions has the same instruction type, the invention is not intended to be limited to speculative pairing based on instruction type. On the contrary, one skilled in the art may readily appreciate other speculative pairing rules depending upon the configuration of execution resources within a microprocessor employing the present invention.

The translator 120 generates the pair split signal 342 to indicate whether the two micro instructions generated by the translator 120 are pairable for parallel execution within the single pipeline of the microprocessor 100. In particular, if the translator 120 detects the paired micro instructions have an operand dependency or resource conflict, then the translator 120 asserts the pair split signal 342.

Multiplexer 326 selects between a micro instruction from the translator 120 and a micro instruction from the instruction queue 122 for storing in instruction register 126. If the instruction register 127 is available, control logic 332 controls multiplexer 326 to select the micro instruction from the translator 120. If the instruction register 127 is not available, control logic 332 controls multiplexer 326 to select the micro instruction from the instruction queue 122.

The instruction register 127 is available if it has provided its micro instructions to the register stage of the microprocessor 100, and is thus available to receive other micro instructions. However, if instruction queue 122 already has micro instructions queued from the translator 120, i.e., the instruction queue 122 is not empty, then the instruction register 127 is not available for the translator 120 to store micro instructions, but rather receives micro instructions from the instruction queue 122.

Multiplexer 328 receives the output 348 of AND gate 352 and pair indicator signal 346, for conveying a value of pair indicator 362, from the instruction queue 122 and selects between the two inputs to program pair indicator 128. If the instruction register 127 is available, control logic 332 controls multiplexer 328 to select signal 348. If the instruction register 127 is not available, control logic 332 controls multiplexer 328 to select signal 346.

Multiplexer 324 selects between a micro instruction from the translator 120, a micro instruction from the instruction queue 122 and a micro instruction from instruction register 126 via feedback signal 364 for storing in instruction register 124. If the instruction register 127 is available, control logic 332 controls multiplexer 324 to select the micro instruction from the translator 120. If the instruction register 127 is not available, control logic 332 controls multiplexer 324 to select the micro instruction from the instruction queue 122.

However, if instruction register 126 contains a micro instruction that had been paired by translator 120 with another micro instruction stored in instruction register 124, and which was determined by the translator 120 to be unpairable with the micro instruction in instruction register 124, such as due to a resource conflict or operand dependency, then control logic 332 controls multiplexer 324 to select the micro instruction from instruction register 126 rather than the micro instruction from the translator 120 or the instruction queue 122. That is, if the pair indicator 128 was programmed to indicate the pair of micro instructions in the instruction register 127 may not be executed in parallel within the single pipeline of the microprocessor 100 during one clock cycle, then the instruction pair split logic 121 redirects the micro instruction stored in instruction register 126 back for storage in instruction register 124 during a subsequent clock cycle, thereby effecting a split of the micro instructions speculatively paired by the translator 120.

Figure 4:
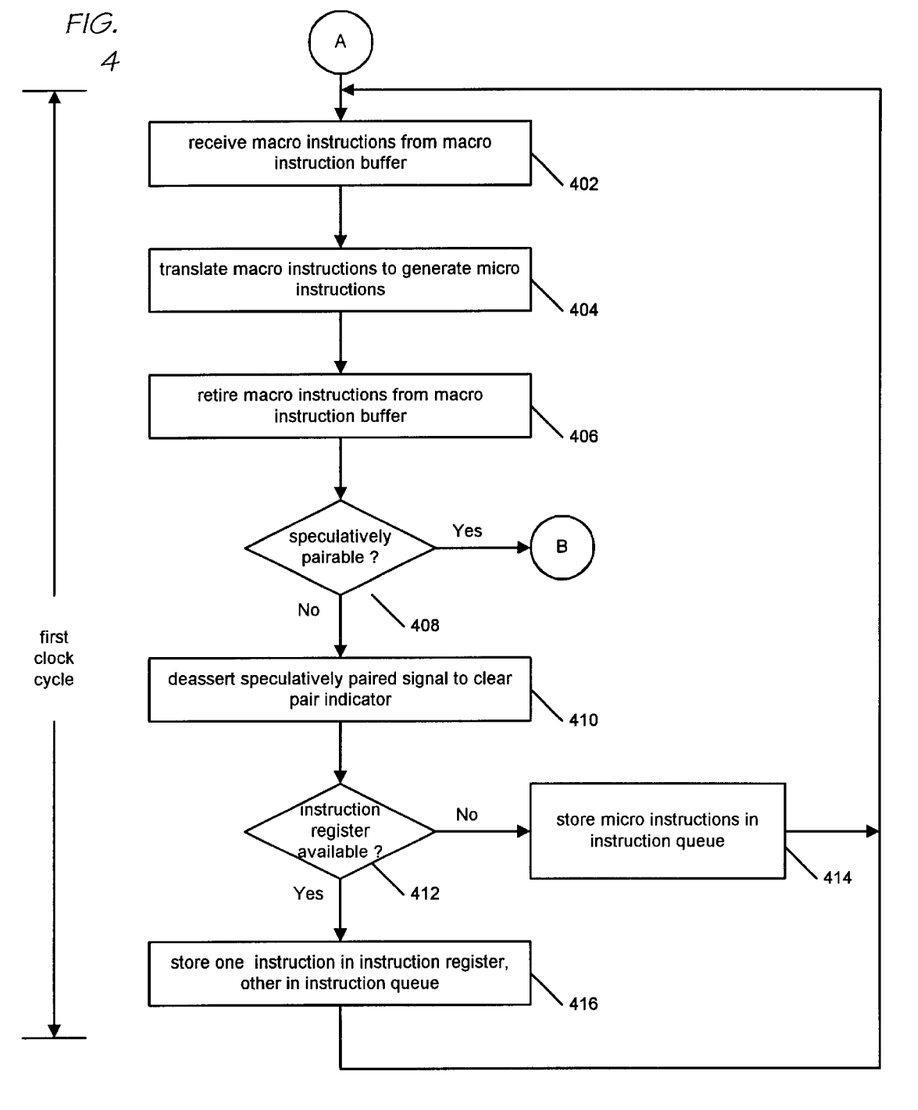
FIG. 4 is a flow chart illustrating operation of the microprocessor of FIGS. 1 through 3 according to the present invention.

Referring now to FIG. 4, a flow chart illustrating operation of the microprocessor 100 of FIGS. 1 through 3 according to the present invention is shown. The translator 120 receives one or more macro instructions from the macro instruction buffer 110, in step 402.

The translator 120 translates the macro instructions to generate micro instructions, in step 404. The translator 120 is capable of translating one or more macro instructions at a time into one or more micro instructions.

Once the translator 120 has translated the macro instructions, the translator 120 retires the translated macro instructions from the macro instruction buffer 110, in step 406. Retiring the macro instructions from the macro instruction buffer 110 comprises removing the macro instruction bytes from the macro instruction buffer 110.

Preferably, the translator 120 scans the macro instruction buffer 110 during steps 402 and 404, rather than removing the macro instruction bytes. This allows the translator 120 to determine, for example, whether two macro instructions will translate into two pairable micro instructions. However, if the two macro instructions scanned are not pairable, it may be advantageous to only retire the first macro instruction from the macro instruction buffer 110 during the current clock cycle and wait for the next clock cycle to translate the second macro instruction. The present invention advantageously enables the translator 120 to retire two macro instructions if they translate into speculatively pairable micro instructions even though the translator 120 may not know at the time of speculative pairing whether resource conflicts or operand dependencies exist.

The translator 120 determines whether two of the micro instructions translated from the macro instructions during step 404 have a likelihood of being pairable for parallel execution within the single pipeline of the microprocessor 100, in step 408. As discussed above, the criteria for determining whether micro instructions have a likelihood of being pairable is a function of the configuration of the various stages of the pipeline, and in particular the resources available for executing micro instructions in parallel in the single pipeline.

In the embodiment of FIG. 2, the translator 120 determines whether the micro instructions are speculatively pairable by determining whether the micro instructions have the same micro instruction type. In particular, if the micro instructions are both MMX micro instructions, then the translator 120 considers the micro instructions speculatively pairable.

If the micro instructions are not speculatively pairable, then the translator 120 deasserts the speculatively pair signal 344 in order to clear the pair indicator 128 through AND gate 352, in step 410.

The control logic 332 determines whether the instruction register 127 is available, in step 412. The instruction register 127 is available if it has provided its micro instructions to the register stage of the microprocessor 100, and is thus available to receive other micro instructions. However, if instruction queue 122 already has micro instructions queued from the translator 120, i.e., the instruction queue 122 is not empty, then the instruction register 127 is not available for the translator 120 to store micro instructions, but rather receives micro instructions from the instruction queue 122.

If the instruction register 127 is available, the control logic 332 controls multiplexer 324 to provide a micro instruction from the translator 120 to instruction register 124 and controls the instruction queue 122 to store the other micro instruction to instruction queue 122, in step 416. If the instruction register 127 is not available, the control logic 332 controls the instruction queue 122 to store the micro instructions to instruction queue 122, in step 414. Then control returns to step 402 for reception and translation of more macro instructions.

If at step 408 the translator 120 determines that the micro instructions are speculatively pairable, then translator 120 asserts speculatively pair signal 344 for indicating that the micro instructions have been speculatively paired for parallel execution within the single pipeline of the microprocessor 100, in step 422.

The control logic 332 determines whether the instruction register 127 is available, in step 424. If the instruction register 127 is available, the control logic 332 controls multiplexer 324 and multiplexer 326 to store the paired micro instructions in the instruction register 127, in step 426. However, if the instruction register 127 is not available, control logic 332 controls the instruction queue 122 to store the paired micro instructions in the instruction queue 122, in step 428.

The translator 120 determines whether a resource conflict exists, in step 430 and whether an operand dependency exists, in step 432. If neither a resource conflict nor an operand dependency exists, then translator 120 deasserts the pair split signal 342 to set the pair indicator 128 to indicate that the paired micro instructions may be executed in parallel within the single pipeline of the microprocessor 100, in step 434.

During a subsequent clock cycle, the paired micro instructions in the instruction register 127 and the pair indicator 128 are provided to the register stage of the microprocessor 100 to begin execution of the paired micro instructions, in step 436. The subsequent stages of the microprocessor 100 pipeline, i.e., the register, address, execute and write-back stages, receive the pair indicator 128 and execute the paired micro instructions in parallel as appropriate upon detecting that the paired micro instruction may be executed in parallel.

Preferably, steps 430, 432 and 434 are performed prior to the end of the clock cycle in which the paired micro instructions are stored in the instruction register 127 or instruction queue 122. That is, steps 402 through 434 occur during a single clock cycle. Hence, the present invention translates macro instructions and generates paired micro instructions and stores the paired micro instructions in an instruction register in a single clock cycle for provision to execution stages of the single pipeline during subsequent clock cycles. Thus, the present invention advantageously achieves zero clock cycle pairing of instructions since the pairing does not require any additional clock cycles beyond what would normally be required to generate non-paired micro instructions.

If a resource conflict or operand dependency is detected at step 430 or 432, respectively, translator 120 asserts the pair split signal 342 to clear pair indicator 128 to indicate that the micro instructions stored in the instruction register 127 may not be executed in parallel due to a resource conflict or operand dependency, in step 442.

During a subsequent clock cycle, the instruction register 127 provides the split micro instructions and pair indicator 128 indicating the instructions have been split, i.e., that the micro instruction stored in instruction register 126 is invalid and not to be executed, to the register stage of the microprocessor 100 to begin execution of the first micro instruction, i.e., the instruction stored in instruction register 124, in step 444. The subsequent stages of the microprocessor 100 pipeline receive the pair indicator 128 and execute only the micro instruction in instruction register 124, treating the micro instruction in instruction register 126 as an invalid instruction upon detecting that the pair indicator 128 is cleared.

During the same clock cycle as step 444, the control logic 332 controls multiplexer 324 to feedback, or redirect, or reorder, the second micro instruction stored in instruction register 126 back for storage in instruction register 124, in step 446.

During a subsequent clock cycle, the instruction register 127 provides the second, reordered, micro instruction to the register stage be begin execution, in step 448.

By feeding back the second micro instruction back to the instruction register 124 and providing the second micro instruction to the register stage after the providing the first micro instruction to the register stage, the present invention effects a split of the micro instructions speculatively paired by the translator 120 by achieving sequential execution of the speculatively paired micro instructions rather than parallel execution. The speculative pairing and subsequent splitting of the paired micro instructions advantageously enables zero clock cycle pairing of micro instructions for parallel execution within a single pipeline of the microprocessor 100.

Figure 5:
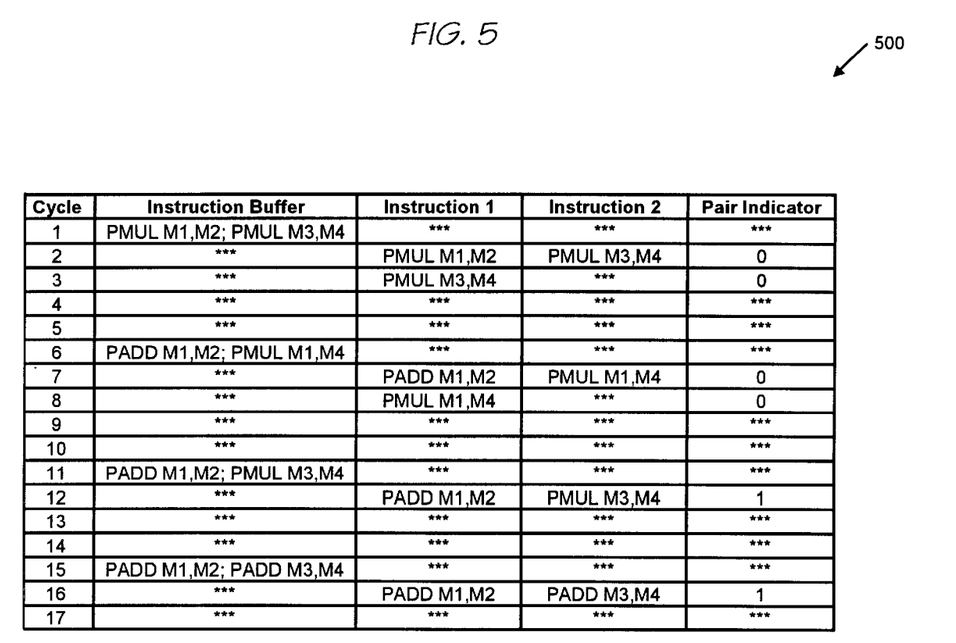
FIG. 5 is a table illustrating clock cycle timings of the operation of the microprocessor of FIGS. 1 through 3 according to the present invention.

Referring now to FIG. 5, a table 500 illustrating clock cycle timings of the operation of the microprocessor 100 of FIGS. 1 through 3 according to the present invention is shown. Table 5 illustrates four examples of macro instruction translation according to the present invention. The examples correspond to micro instruction pairing rules suitable for the embodiment of microprocessor 100 shown in FIG. 3. That is, all resources within the microprocessor 100 are conflicting resources with respect to parallel execution of paired micro instructions within the single pipeline of the microprocessor 100, except that MMX adder A 212 and MMX adder B 214 may execute micro instructions concurrently with each other or individually concurrently with either the MMX multiplier 216 or the MMX shifter 218.

In each of the four examples, two macro instructions, indicated in the "Instruction Buffer" column, are received from the macro instruction buffer 110. The macro instruction to the left of the semicolon is the first macro instruction in the macro instruction stream. The two macro instructions are translated by the translator 120 into two micro instructions, indicated in the "Instruction 1" and "Instruction 2" columns. The "Instruction 1" column corresponds to the contents of instruction register 124 and the "Instruction 2" column corresponds to the contents of instruction register 126 at the end of a clock cycle specified by the "Cycle" column. The "Pair Indicator" column indicates the contents of pair indicator 128 at the end of the specified clock cycle. In table 500, register contents before and after those of interest are designated by "****".

In the first example, during clock cycle 1, two x86 MMX macro instructions, a PMUL (packed multiply) of MMX registers M1 and M2 and a PMUL of MMX registers M3 and M4, are fetched into the macro instruction buffer 110.

During clock cycle 2, the translator 120 translates the two macro instructions. The translator 120 generates a pair of micro instructions, a PMUL of MMX registers M1 and M2 micro instruction and a PMUL of MMX registers M3 and M4 micro instruction. The paired micro instructions are stored in instruction register 124 and 126, respectively. In this embodiment, the translator 120 pairs the PADD and PMUL micro instructions because they have the same instruction type, that is, they are both MMX micro instructions. As discussed above, the present invention may be utilized using other pairing rules without departing from the spirit and scope of the invention as defined by the appended claims.

The pair indicator 128 is programmed to be clear for indicating that the two micro instructions may not be executed in parallel within the single pipeline of the microprocessor 100. In this example, the micro instructions cannot be executed in parallel because they utilize conflicting resources, namely the MMX multiplier 216. That is, the two micro instructions cannot be executed using MMX multiplier 216 concurrently. Thus, they must be split by the instruction pair split logic 121.

Consequently, during clock cycle 3, the PMUL M1, M2 micro instruction is presented to the register stage along with the pair indicator 128 indicating the second micro instruction is not valid, i.e., that it may not be executed in parallel with the first micro instruction. Concurrently, the PMUL M3, M4 micro instruction is redirected, or fed back, to instruction register 124, as shown. During clock cycle 4, the PMUL M3, M4 micro instruction is provided to the register stage along with the cleared pair indicator 128.

In the second example, during clock cycle 6, two x86 MMX macro instructions, a PADD (packed add) of MMX registers M1 and M2 and a PMUL of MMX registers M1 and M4, are fetched into the macro instruction buffer 110.

During clock cycle 7, the translator 120 translates the two macro instructions. The translator 120 generates a pair of micro instructions, a PADD of MX registers M1 and M2 micro instruction and a PMUL of MMX registers M1 and M4 micro instruction. The paired micro instructions are stored in instruction register 124 and 126, respectively.

The pair indicator 128 is programmed to be clear for indicating that the two micro instructions may not be executed in parallel within the single pipeline of the microprocessor 100. In this example, the micro instructions cannot be executed in parallel because they have an operand dependency, namely MMX register M1. That is, the PMUL micro instruction requires the result of the PADD micro instruction in destination register M1 of the PADD before it can execute. Thus, the two micro instructions cannot be executed in parallel within the single pipeline of microprocessor 100. Thus, they must be split by the instruction pair split logic 121.

Consequently, during clock cycle 8, the PADD M1, M2 micro instruction is provided to the register stage along with the pair indicator 128 indicating the second micro instruction is not valid, i.e., that it may not be executed in parallel with the first micro instruction. Concurrently, the PMUL M1, M4 micro instruction is reordered back to instruction register 124, as shown. During clock cycle 9, the PMUL M1, M4 micro instruction is presented to the register stage along with the cleared pair indicator 128.

In the third example, during clock cycle 11, two x86 MMX macro instructions, a PADD M1,M2 and a PMUL M3,M4, are fetched into the macro instruction buffer 110.

During clock cycle 12, the translator 120 translates the two macro instructions. The translator 120 generates a pair of micro instructions, a PADD M1,M2 micro instruction and a PMUL M3,M4 micro instruction. The paired micro instructions are stored in instruction register 124 and 126, respectively.

The pair indicator 128 is programmed to be set for indicating that the two micro instructions may be executed in parallel within the single pipeline of the microprocessor 100. In this example, the micro instructions may be executed in parallel because they have no resource conflict and no operand dependency. That is, according to the embodiment of microprocessor 100 used for illustration of the present invention in association with FIG. 5, the PADD micro instruction may be executed by one of the MMX adders 212 or 214 while the PMUL micro instruction is concurrently executed by MMX multiplier 216. Furthermore, the two micro instructions utilize different registers for their operands and therefore do not pose an operand dependency.

Therefore, during clock cycle 13, the paired PADD M1, M2 and PMUL M3,M4 micro instructions are presented to the register stage along with the pair indicator 128 indicating the micro instructions are paired, i.e., that they may be executed in parallel.

In the fourth example, during clock cycle 15, two x86 MMX macro instructions, a PADD M1,M2 and a PADD M3,M4, are fetched into the macro instruction buffer 110.

During clock cycle 16, the translator 120 translates the two macro instructions. The translator 120 generates a pair of micro instructions, a PADD M1,M2 micro instruction and a PADD M3,M4 micro instruction. The paired micro instructions are stored in instruction register 124 and 126, respectively.

The pair indicator 128 is programmed to be set for indicating that the two micro instructions may be executed in parallel within the single pipeline of the microprocessor 100. In this example, the micro instructions may be executed in parallel because they have no resource conflict and no operand dependency. That is, one of the PADD micro instructions may be executed by one of the MMX adders 212 or 214 while the other PADD micro instruction is concurrently executed by the other of the MMX adders 212 or 214. Furthermore, the two micro instructions utilize different registers for their operands and therefore do not pose an operand dependency.

Therefore, during clock cycle 17, the paired PADD M1, M2 and PADD M3,M4 micro instructions are presented to the register stage along with the pair indicator 128 indicating the micro instructions are paired, i.e., that they may be executed in parallel.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A microprocessor for speculatively pairing micro instructions for parallel execution within a single pipeline, the micro instructions paired within the single pipeline when they utilize non-conflicting resources, the microprocessor comprising:

a translator, for receiving macro instructions, and for generating a pair of micro instructions;

instruction pair split logic, coupled to said translator, for splitting said pair of micro instructions when they utilize a conflicting resource; and an instruction register, coupled to said translator and to said instruction pair split logic, for storing said pair of micro instructions, wherein said translator receives said macro instructions, generates said pair of micro instructions and stores said pair of micro instructions in said instruction register during a first clock cycle.

2. The microprocessor of claim 1, wherein if said pair of micro instructions utilize the non-conflicting resources, said instruction register provides said pair of micro instructions to the single pipeline during a second clock cycle.

3. The microprocessor of claim 2, wherein said second clock cycle is subsequent to said first clock cycle.

4. The microprocessor of claim 1, wherein if said pair of micro instructions utilize said conflicting resource, said instruction register provides one of said pair of micro instructions to the single pipeline during a second clock cycle and provides the other of said pair of micro instructions to the pipeline during a third clock cycle.

5. The microprocessor of claim 4, wherein said third clock cycle is subsequent to said second clock cycle.

6. The microprocessor of claim 1, further comprising:
an instruction buffer, coupled to said translator, for providing said macro instructions to said translator.

7. A microprocessor for speculatively pairing micro instructions for parallel execution within a single pipeline, the micro instructions paired within the single pipeline when they utilize non-conflicting resources, the microprocessor comprising:
a translator, for receiving macro instructions, and for generating a pair of micro instructions;
instruction pair split logic, coupled to said translator, for splitting said pair of micro instructions when they utilize a conflicting resource, wherein said instruction pair split logic comprises:
a pair indicator, for indicating whether said pair of micro instructions stored in said instruction register may be executed in parallel within the single pipeline; and
an instruction register, coupled to said translator and to said instruction pair split logic, for storing said pair of micro instructions.

8. The microprocessor of claim 7, wherein said pair indicator is provided to the single pipeline for use in determining whether said pair of micro instructions may be executed in parallel.

9. The microprocessor of claim 8, wherein the single pipeline comprises an MMX unit.

10. A microprocessor for speculatively pairing micro instructions for parallel execution within a single pipeline, the micro instructions paired within the single pipeline when they utilize non-conflicting resources, the microprocessor comprising:
a translator, for receiving macro instructions, and for generating a pair of micro instructions;
instruction pair split logic, coupled to said translator, for splitting said pair of micro instructions when they utilize a conflicting resource, wherein said instruction pair split logic comprises:
instruction redirection logic, coupled to said instruction register, for feeding back one of said pair of micro instructions to said instruction register while said instruction register provides the other of said pair of micro instructions to the single pipeline, thereby effecting a split of said pair of micro instructions; and
an instruction register, coupled to said translator and to said instruction pair split logic, for storing said pair of micro instructions.

11. A microprocessor for speculatively pairing micro instructions for parallel execution within a single pipeline, the micro instructions paired within the single pipeline when they utilize non-conflicting resources, the microprocessor comprising:
a translator, for receiving macro instructions, and for generating a pair of micro instructions;
instruction pair split logic, coupled to said translator, for splitting said pair of micro instructions when they utilize a conflicting resource;
an instruction register, coupled to said translator and to said instruction pair split logic, for storing said pair of micro instructions; and
an instruction queue, coupled between said translator and said instruction register, for selectively storing said pair of micro instructions until said instruction register becomes available.

12. The microprocessor of claim 11, wherein said instruction queue is further configured to store an indication of whether said pair of micro instructions may be executed in parallel within the single pipeline.

13. A microprocessor for speculatively pairing micro instructions for parallel execution within a single pipeline, the micro instructions paired within the single pipeline when they utilize non-conflicting resources, the microprocessor comprising:
a translator, for receiving macro instructions, and for generating a pair of micro instructions; and
instruction pair split logic, coupled to said translator, for splitting said pair of micro instructions when they utilize a conflicting resource, wherein said translator generates said pair of micro instructions when said pair of micro instructions have the same instruction type, wherein having the same instruction type comprises having an MMX instruction type.

14. A microprocessor for speculatively pairing micro instructions for parallel execution within a single pipeline, the micro instructions paired within the single pipeline when they utilize non-conflicting resources, the microprocessor comprising:
a translator, for receiving macro instructions, and for generating a pair of micro instructions; and
instruction pair split logic, coupled to said translator, for splitting said pair of micro instructions when they utilize a conflicting resource, wherein said translator generates a pair split signal to said instruction pair split logic when said pair of micro instructions utilize said conflicting resource.

15. A microprocessor for speculatively pairing micro instructions for parallel execution within a single pipeline, the micro instructions paired within the single pipeline when they utilize non-conflicting resources, the microprocessor comprising:
a translator, for receiving macro instructions, and for generating a pair of micro instructions; and
instruction pair split logic, coupled to said translator, for splitting said pair of micro instructions when they utilize a conflicting resource, wherein said translator generates said pair split signal to said instruction pair split logic when said pair of micro instructions have an operand dependency.

16. A microprocessor for speculatively pairing micro instructions for parallel execution within a single pipeline, the micro instructions paired within the single pipeline when they utilize non-conflicting resources, the microprocessor comprising:
a translator, for receiving macro instructions, and for generating a pair of micro instructions; and
instruction pair split logic, coupled to said translator, for splitting said pair of micro instructions when they utilize a conflicting resource, wherein said translator generates a speculatively paired signal to said instruction pair split logic to indicate a likelihood that said pair of micro instructions may be paired for parallel execution within the single pipeline.

17. A microprocessor for speculatively pairing micro instructions for parallel execution within a single pipeline, the micro instructions paired within the single pipeline when they utilize non-conflicting resources, the microprocessor comprising:

a translator, for receiving macro instructions, and for generating a pair of micro instructions;

instruction pair split logic, coupled to said translator, for splitting said pair of micro instructions when they utilize a conflicting resource; and an execution unit within the single pipeline, configured to receive said pair of micro instructions, and to execute said pair of micro instructions in parallel, wherein said execution unit comprises an MMX execution unit.

18. A microprocessor for speculatively pairing micro instructions for parallel execution within a single pipeline, the micro instructions paired within the single pipeline when they utilize non-conflicting resources, the microprocessor comprising:

a translator, for receiving macro instructions, and for generating a pair of micro instructions; and instruction pair split logic coupled to said translator, for splitting said pair of micro instructions when they utilize a conflicting resource, wherein said conflicting resource includes at least one of an arithmetic logic unit, a register file, an address generator, memory access logic and write-back logic.

19. An apparatus for selectively unpairing speculatively paired first and second micro instructions for parallel execution within a single pipeline of a microprocessor, the speculative pairing performed by a translator of the microprocessor, the unpairing performed when the micro instructions utilize a conflicting resource, the microprocessor also having an instruction register for storing the first and second micro instructions, the apparatus comprising:

an unpairing signal generated by the translator for indicating whether the first and second micro instructions utilize the conflicting resource within the single pipeline;

instruction redirection logic, coupled to the instruction register, for redirecting the second micro instruction to the instruction register; and control logic, coupled to said instruction redirection logic, configured to control said instruction redirection logic to selectively redirect the second micro instruction to the instruction register in response to said unpairing signal.

20. The apparatus of claim 19, wherein the first and second micro instructions are stored in the instruction register during a first clock cycle, wherein said control logic controls said instruction redirection logic to redirect the second micro instruction back to the instruction register during a second clock cycle, thereby unpairing the second micro instruction from the first micro instruction.

21. The apparatus of claim 20, wherein the translator generates said unpairing signal during said first clock cycle.

22. The apparatus of claim 20, wherein said control logic controls said instruction redirection logic to direct the first and second micro instructions to the instruction register during said first clock cycle.

23. The apparatus of claim 19, further comprising:

a paired instruction indicator, for indicating whether the first and second micro instructions are paired for parallel execution within the single pipeline.

24. The apparatus of claim 23, further comprising:

pair disable logic, coupled to said paired instruction indicator and said unpairing signal, for programming said paired instruction indicator in response to said unpairing signal.

25. The apparatus of claim 23, wherein said paired instruction indicator is operatively coupled to the conflicting resource.

26. The apparatus of claim 25, wherein the instruction register provides the first and second micro instructions to the conflicting resource.

27. The apparatus of claim 19, further comprising:

a speculatively paired signal generated by the translator for indicating whether the first and second micro instructions may be paired for parallel execution within the single pipeline.

28. The apparatus of claim 27, wherein the translator asserts said speculatively paired signal to indicate the first and second micro instructions may be paired when the first and second micro instructions have the same instruction type.

29. The apparatus of claim 28, wherein the translator asserts said speculatively paired signal to indicate the first and second micro instructions may be paired when the first and second micro instructions each comprise MMX instructions.

30. The apparatus of claim 19, further comprising:

an instruction queue, coupled between the translator and the instruction register, for storing the first and second micro instructions until the instruction register is empty.

31. The apparatus of claim 19, wherein the translator further generates said unpairing signal for indicating whether the first and second micro instructions have an operand dependency.

32. An apparatus for selectively unpairing speculatively paired micro instructions for parallel execution within a single pipeline of a microprocessor by a translator of the microprocessor, the unpairing performed when the paired micro instructions utilize a conflicting resource, the microprocessor having an instruction register for storing the paired micro instructions, the apparatus comprising:

a pair indicator, for indicating whether the paired micro instructions are paired for parallel execution within the single pipeline; and pair disable logic, coupled to the translator and said pair indicator, for clearing said pair indicator when the paired micro instructions utilize the conflicting resource.

33. The apparatus of claim 32, further comprising:

a pair disable signal generated by the translator, coupled to said pair disable logic, for indicating whether the paired micro instructions utilize the conflicting resource.

34. The apparatus of claim 33, further comprising:

a speculatively paired signal generated by the translator, coupled to said pair disable logic, for indicating a likelihood that the paired micro instructions may be executed in parallel within the single pipeline;

wherein said pair disable logic sets the pair indicator if said speculatively paired signal indicates a likelihood that the paired micro instructions may be executed in parallel within the single pipeline and said pair disable signal does not indicate the paired micro instructions utilize the conflicting resource.

35. The apparatus of claim 33, further comprising:

instruction selection logic, coupled to the instruction register and the translator, configured to selectively provide first and second of the paired micro instructions to the instruction register during a first clock cycle, and to receive said second of the paired micro instructions and selectively provide said second instruction to the instruction register during a second clock cycle.

36. The apparatus of claim 35, wherein said instruction selection logic provides a third micro instruction to the instruction register rather than said second micro instruction during said second clock cycle if said pair disable signal does not indicate the paired micro instructions utilize the same microprocessor resources.

37. A microprocessor for speculatively pairing micro instructions for parallel execution within a single pipeline, comprising:

a translator for translating macro instructions into paired micro instructions for parallel execution within the single pipeline;

an instruction register, coupled to said translator, for storing said paired micro instructions;

at least two resources within the single pipeline of the microprocessor, operatively coupled to said instruction register, for executing micro instructions; and instruction reorder logic, coupled between said translator and said instruction register, for reordering said paired micro instructions for sequential execution within the single pipeline rather than parallel execution when said paired micro instructions utilize the same one of said at least two resources.

38. The microprocessor of claim 37, wherein said at least two resources comprise at least two of any combination of the following: an MMX adder, an MMX multiplier, an MMX shifter, a register file, an address generator, memory access logic, a floating point arithmetic logic unit and an integer arithmetic logic unit.

39. The microprocessor of claim 37, wherein said instruction reorder logic reorders said paired micro instructions for sequential execution within the single pipeline rather than for parallel execution when said paired micro instructions have an operand dependency.

40. The microprocessor of claim 37, further comprising:

an instruction pair indicator, coupled to said translator, for indicating whether said paired micro instructions are to be executed in parallel within the single pipeline; and pair disable logic, coupled to said translator and to said instruction pair indicator, for programming said instruction pair indicator to indicate whether said paired micro instructions are to be executed in parallel within the single pipeline.

41. A method for speculatively pairing micro instructions for parallel execution within a single pipeline of a microprocessor, the method comprising:

pairing first and second micro instructions for parallel execution within the single pipeline;

determining if said first and second micro instructions utilize a conflicting resource;

splitting said first and second micro instructions for sequential execution after said pairing if said first and second micro instructions utilize said conflicting resource; and translating one or more macro instructions into said first and second micro instructions prior to said pairing.

42. The method of claim 41, further comprising:

receiving said one or more macro instructions from an instruction buffer prior to said translating; and retiring said one or more macro instructions from said instruction buffer.

43. The method of claim 42, wherein said receiving, said translating and said retiring are performed within the same clock cycle.

44. A method for speculatively pairing micro instructions for parallel execution within a single pipeline of a microprocessor, the method comprising:

pairing first and second micro instructions for parallel execution within the single pipeline;

determining if said first and second micro instructions utilize a conflicting resource; and splitting said first and second micro instructions for sequential execution after said pairing if said first and second micro instructions utilize said conflicting resource;

wherein said splitting said first and second micro instructions comprises:
programming a status indicator for indicating said first and second micro instructions may not be executed in parallel within the single pipeline.

45. The method of claim 44, further comprising:

providing said status indicator along with said first and second micro instructions to the single pipeline.

46. A method for speculatively pairing micro instructions for parallel execution within a single pipeline of a microprocessor, the method comprising:

pairing first and second micro instructions for parallel execution within the single pipeline;

determining if said first and second micro instructions utilize a conflicting resource; and splitting said first and second micro instructions for sequential execution after said pairing if said first and second micro instructions utilize said conflicting resource;

wherein said splitting said first and second micro instructions comprises:
redirecting said second micro instruction for storage in an instruction register if said first and second micro instructions utilize said conflicting resource.

47. A method for speculatively pairing micro instructions for parallel execution within a single pipeline of a microprocessor, the method comprising:

pairing first and second micro instructions for parallel execution within the single pipeline;

determining if said first and second micro instructions utilize a conflicting resource; and splitting said first and second micro instructions for sequential execution after said pairing if said first and second micro instructions utilize said conflicting resource;

wherein said pairing is performed during a first clock cycle, the method further comprising:
executing said first and second micro instructions during a second clock cycle if said first and second micro instructions utilize non-conflicting resources; and
executing said first micro instruction during said second clock cycle and executing said second micro instruction during a third clock cycle if said first and second micro instructions utilize said conflicting resource.

48. A method for speculatively pairing micro instructions for parallel execution within a single pipeline of a microprocessor, the method comprising:
- pairing first and second micro instructions for parallel execution within the single pipeline;
- determining if said first and second micro instructions utilize a conflicting resource; and
- splitting said first and second micro instructions for sequential execution after said pairing if said first and second micro instructions utilize said conflicting resource;
- wherein said pairing comprises:
  - storing said first and second micro instructions into an instruction register.

49. A method for speculatively pairing micro instructions for parallel execution within a single pipeline of a microprocessor, the method comprising:
- pairing first and second micro instructions for parallel execution within the single pipeline;
- determining if said first and second micro instructions utilize a conflicting resource; and
- splitting said first and second micro instructions for sequential execution after said pairing if said first and second micro instructions utilize said conflicting resource;
- wherein said splitting said first and second micro instructions comprises:
  - programming a status indicator to indicate said first and second micro instructions may not be executed in parallel within the single pipeline.

* * * * *